(12) United States Patent
Konishi et al.

(10) Patent No.: US 8,983,256 B2
(45) Date of Patent: Mar. 17, 2015

(54) OPTICAL FIBER CABLE

(75) Inventors: Kazuhisa Konishi, Yokohama (JP); Tomohiko Kanie, Yokohama (JP); Kenichiro Takahashi, Yokohama (JP); Osamu Shimakawa, Yokohama (JP); Yuuichi Mitose, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 14/113,898

(22) PCT Filed: Apr. 23, 2012

(86) PCT No.: PCT/JP2012/060852
§ 371 (c)(1),
(2), (4) Date: Oct. 25, 2013

(87) PCT Pub. No.: WO2012/147688
PCT Pub. Date: Nov. 1, 2012

(65) Prior Publication Data
US 2014/0050448 A1    Feb. 20, 2014

(30) Foreign Application Priority Data

Apr. 28, 2011  (JP) ................. 2011-101665
Apr. 28, 2011  (JP) ................. 2011-101667

(51) Int. Cl.
*G02B 6/44* (2006.01)
*G02B 6/36* (2006.01)
*G02B 6/38* (2006.01)

(52) U.S. Cl.
CPC ............ *G02B 6/4401* (2013.01); *G02B 6/4436* (2013.01); *G02B 6/3624* (2013.01); *G02B 6/3814* (2013.01)

USPC .......................................... 385/109; 385/100

(58) Field of Classification Search
CPC .. G02B 6/4415; G02B 6/4429; G02B 6/4436; G02B 6/4488
USPC .................................... 385/100, 109
See application file for complete search history.

(56) References Cited

U.S. PATENT DOCUMENTS 6,167,177 A  * 12/2000  Sandstrom et al. .......... 385/100
8,355,608 B2 *  1/2013  Hu ................................ 385/27

FOREIGN PATENT DOCUMENTS

| JE | 2009-169110 | 7/2009 |
|----|-------------|--------|
| JP | S59-042504 | 3/1984 |
| JP | S61-019713 | 1/1986 |
| JP | S63-157704 | 10/1988 |
| JP | H2-056506 | 2/1990 |
| JP | H2-144050 | 6/1990 |
| JP | 2000-514930 | 11/2000 |
| JP | 2001-028292 | 1/2001 |
| JP | 2005-265066 | 9/2005 |
| JP | 2007-293298 | 11/2007 |
| JP | 2010-530988 | 9/2010 |

* cited by examiner

*Primary Examiner* — Ryan Lepisto
(74) *Attorney, Agent, or Firm* — Drinker Biddle & Reath LLP

(57) ABSTRACT

An optical fiber cable is provided as one capable of preventing damage of an inside tube and an outside tube. An optical fiber cable 1 is provided with an optical fiber 2 for propagating laser light, an inside tube 3 housing an end portion of this optical fiber 2, and an outside tube 4 arranged outside the inside tube 3 and surrounding the inside tube 3. A space portion 5 is provided between the optical fiber 2 and an inner peripheral surface of the inside tube 3.

6 Claims, 6 Drawing Sheets

(a)

(b)

OPTICAL FIBER CABLE

TECHNICAL FIELD

The present invention relates to an optical fiber cable having an optical fiber for transmitting high-intensity light, for example, such as laser light.

BACKGROUND ART

A known optical fiber cable having an optical fiber for transmitting high-intensity light is, for example, the one described in Patent Literature 1. The optical fiber cable described in Patent Literature 1 is provided with an inside tube housing an end portion of the optical fiber and a metal case (outside tube) provided so as to surround this inside tube, and is constructed to flow a coolant through a space between the inside tube and the metal case. The inside tube is composed of a transparent tube or a metal tube which absorbs stray radiation.

CITATION LIST

Patent Literature

Patent Literature 1: Japanese Translation of PCT International Application Publication No. 2010-530988

SUMMARY OF INVENTION

Technical Problem

In the above conventional technology, however, there is the following problem. Namely, in the case where the inside tube is the metal tube absorbing stray radiation, if there occurs a leakage of high-power laser light not entering a core of the optical fiber or high-power laser light radiated from a cladding of the optical fiber, the high-power laser light will be absorbed by the inside tube to cause a local sudden temperature rise in a portion where the high-power laser light is absorbed in the inside tube, which can damage the mentioned portion of the inside tube.

In the case where the inside tube is the transparent tube, similarly with a leakage of the high-power laser light, the high-power laser light will travel through the transparent tube to be absorbed by the coolant. The coolant usually used is ion exchanged water, from which impurities are removed. However, if impurities are mixed in the coolant to result in decrease of purity, the high-power laser light will become absorbed by the coolant. For this reason, the coolant will be subjected to a sudden temperature rise, so as to result in bumping of the coolant, which can damage the inside tube or the outside tube eventually.

It is an object of the present invention to provide an optical fiber cable capable of preventing the damage of the inside tube and the outside tube.

Solution to Problem

The present invention is an optical fiber cable having an optical fiber, comprising: an inside tube housing an end portion of the optical fiber; and an outside tube provided so as to surround the inside tube, wherein at least an inner wall surface of the inside tube is made of a metal material having a light reflecting property and absorbing part of light, and wherein a space portion is formed between the optical fiber and the inside tube.

In the optical fiber cable of the present invention, as described above, at least the inner wall surface of the inside tube is made of the metal material having the light reflecting property and absorbing part of light, whereby the inner wall surface of the inside tube reflects the majority of leak light such as light not entering a core of the optical fiber or light radiated from a cladding of the optical fiber, and only part of the leak light is absorbed by the inside tube. Since reflection of the leak light on the inside tube and on the optical fiber is repeated in the space portion between the optical fiber and the inside tube, the leak light is gradually attenuated. This suppresses the sudden temperature rise of the inside tube and the outside tube due to absorption of high-intensity light by the inside tube and the outside tube and therefore can prevent the damage of the inside tube and the outside tube.

A cooling space for circulation of a cooling medium is formed between the inside tube and the outside tube. In this case, the cooling medium is made to circulate through the cooling space, thereby to cool the inside tube. This further suppresses the sudden temperature rise of the inside tube due to the absorption of high-intensity light by the inside tube, and thus can further prevent the damage of the inside tube. As described above, the reflection of the leak light is repeated in the space portion between the optical fiber and the inside tube so as to gradually attenuate the leak light, which suppresses the sudden temperature rise of the cooling medium due to absorption of high-intensity light by the cooling medium. Therefore, the coolant is inhibited from bumping, which can also prevent the damage of the inside tube and the outside tube due to the bumping of the coolant.

An end cap comprised of the same material as a core of the optical fiber and having a diameter larger than the core is optically connected to an end face of the optical fiber. Since light is concentrated at the end face of the optical fiber, adhesion of impurities such as dust to the end face of the optical fiber can cause the impurities to be burnt by the high-intensity light, so as to damage the end face of the optical fiber. When the end cap is optically connected to the end face of the optical fiber, the energy density of light decreases at the end of the optical fiber, and it can prevent the damage of the end face of the optical fiber due to the impurities.

A diameter-expanded portion having a larger diameter than a base end side of the inside tube is provided in a tip part of the inside tube. In this case, misalignment light on the entrance side of the optical fiber or reflection return light on the exit side of the optical fiber becomes more likely to enter the inside tube and, therefore, the misalignment light or the reflection return light is prevented from impinging on an end face of the outside tube to damage the end face of the outside tube.

A taper portion with a diameter increasing toward the diameter-expanded portion is provided on the base end side of the diameter-expanded portion in the inside tube. For example, the misalignment light or the reflection return light entering the inside tube often first impinges on an inner wall surface of the taper portion. At this time, these light beams are obliquely incident to the inner wall surface of the taper portion, which can decrease the energy density of light.

The outside tube may be made of a metal material having thermal conductivity, and an outer peripheral surface of the inside tube may be in direct contact with an inner peripheral surface of the outside tube. For example, when the intensity of the light transmitted in the optical fiber is not so high, the cooling medium does not have to be circulated in particular between the inside tube and the outside tube and, then, heat generated by light absorbed by the inside tube is allowed to be dissipated by the outside tube. In this case, the cooling medium is not circulated between the inside tube and the outside tube, which can simplify the terminal structure of the optical fiber cable and achieve reduction of cost.

An example of the conventionally known optical fiber cable having the optical fiber for transmitting high-intensity light is one provided with a wall involving a coolant (e.g., cooling water) surrounding an exterior coating surface of an end of the optical fiber, and a transparent window in optical contact with the end face of the optical fiber. There is, however, the following problem in this conventional technology. Namely, the coolant is circulated in general and it is necessary to keep airtightness between the transparent window and the wall, in order to prevent the coolant from leaking. For this reason, the transparent window needs to be fixed to the wall with application of a sufficient fixing force, resulting in applying the force to the transparent window. Furthermore, the flow of the coolant also applies a force to the transparent window, so as to deform the transparent window and result in change in refractive index of the transparent window. Therefore, it degrades the quality of the laser light, e.g., change in intensity distribution of the laser light passing through the transparent window, occurrence of distortion of the laser light, and so on. That results in degradation of processing accuracy in laser processing with the laser light.

On the other hand, the load on the transparent window for fixing it to the wall can be reduced by using a rubber O-ring for ensuring the airtightness between the transparent window and the wall. However, if the laser light leaks to impinge on the O-ring, the O-ring can be damaged thereby. Furthermore, part of the laser light not entering the core of the optical fiber, out of the laser light passing through the transparent window, is directly incident into the coolant to be absorbed therein. The coolant to be usually used is a liquid with high purity, such as ion exchanged water. However, if impurities are mixed in the coolant, as described above, the light absorptivity of the coolant will increase, which can cause the bumping of the coolant, resulting in damage of the wall. Namely, there is the problem that the optical fiber cable can be damaged due to the bumping of the coolant, as mentioned above as the technical problem.

Then, the present invention is an optical fiber cable having an optical fiber, comprising: a tubular member housing an end portion of the optical fiber; an outside transparent window being in optical contact with an end face of the optical fiber and held on the tubular member; and an inside transparent window arranged inside the outside transparent window in an interior of the tubular member and hermetically fixed to the tubular member and a cladding of the optical fiber, wherein a space inside the inside transparent window in the interior of the tubular member forms a coolant-circulating region for circulation of a coolant, and wherein a gap portion is provided between the outside transparent window and the inside transparent window.

When this optical fiber cable of the present invention is used, the coolant is circulated through the space (coolant-circulating region) inside the inside transparent window in the interior of the tubular member. At this time, the coolant is in contact with the inside transparent window but, since the inside transparent window is hermetically fixed to the tubular member and the cladding of the optical fiber, the coolant applies a force to the inside transparent window to deform the inside transparent window. However, even if the inside transparent window is deformed, the deformation will not affect the light propagating in the core of the optical fiber. On the other hand, the outside transparent window is in optical contact with the end face of the optical fiber but, since the gap portion is provided between the outside transparent window and the inside transparent window, the deformation of the inside transparent window is not transferred to the outside transparent window. Therefore, it can prevent deformation of the outside transparent window in optical contact with the end face of the optical fiber.

An outside surface of the outside transparent window is an interface to air, the gap portion is provided between an inside surface of the outside transparent window and an outside surface of the inside transparent surface, and an inside surface of the inside transparent window is in contact with the coolant. For this reason, light not entering the core of the optical fiber out of the light passing through the outside transparent window is reflected little by little by the inside surface of the outside transparent window, and the outside surface and inside surface of the inside transparent window. Therefore, the intensity of the light absorbed by the coolant becomes lowered, which can prevent the bumping of the coolant.

An outer peripheral surface of the cladding is subjected to a treatment for removing light propagating in the cladding. In this case, the light propagating in the cladding of the optical fiber is scattered so as to become easier to be radiated to the outside of the optical fiber, which reduces the light propagating in the cladding. This can prevent such a trouble that the light emerges from the cladding, for example, at a bent portion of the optical fiber cable to cause disconnection of a jacket of the optical fiber cable.

A refractive index of the inside transparent window is equal to or higher than a refractive index of the cladding. More preferably, the inside transparent widow is fusion-spliced to the cladding. In this case, the light propagating in the cladding of the optical fiber becomes more likely to be guided into the inside transparent window, thereby reducing the light propagating in the cladding. This can prevent such a trouble that the light emerges from the cladding, for example, at a bent portion of the optical fiber cable to cause disconnection of the jacket of the optical fiber cable.

The inside transparent window is hermetically fixed to the tubular member so that, with a metal gasket being interposed between the tubular member and the inside transparent window, a force in a direction to crush the metal gasket is applied to the inside transparent window. In this case, the inside transparent window can be securely hermetically fixed to the tubular member.

A holding force between the tubular member and the outside transparent window is smaller than a fixing force between the tubular member and the inside transparent window. In this case, the outside transparent window can be held on the tubular member by a simple structure.

Advantageous Effect of Invention

The present invention realizes the prevention of the damage of the inside tube and the outside tube. This makes it feasible to improve the reliability of the optical fiber cable having the optical fiber for transmitting the high-intensity light.

DESCRIPTION OF EMBODIMENTS

The preferred embodiments of the optical fiber cable according to the present invention will be described below in detail with reference to the drawings.

First Embodiment

Figure 1:
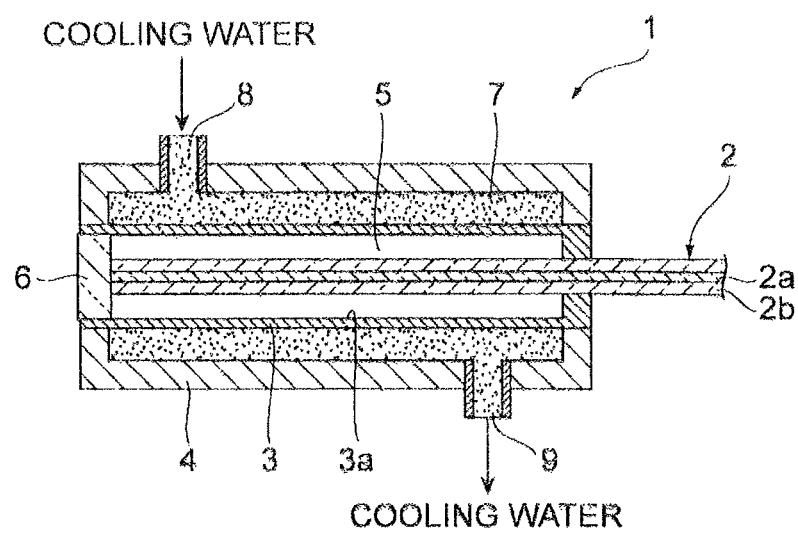
FIG. 1 is a cross-sectional view showing an optical fiber cable according to the first embodiment.

FIG. 1 is a cross-sectional view showing the optical fiber cable according to the first embodiment. In FIG. 1, the optical fiber cable 1 of the present embodiment is one to be used in a laser processing machine for applying laser light with high intensity (e.g., from 2 kW to 10 kW) to weld or cut an iron plate such as a body of a vehicle.

The optical fiber cable 1 is provided with an optical fiber 2 for propagating the laser light, an inside tube 3 of metal housing an end portion of this optical fiber 2, and an outside tube 4 of metal arranged outside this inside tube 3 and surrounding the inside tube 3. A space portion 5 is provided between the optical fiber 2 and an inner peripheral surface of the inside tube 3. The inside tube 3 and the outside tube 4 are provided at both end portions of the optical fiber cable 1.

The part except for the end portions in the optical fiber cable 1 is not shown in particular, but it has, for example, a structure in which the optical fiber 2 is protected by a flexible tube of stainless steel and in which a resin layer is formed on the surface of the flexible tube.

The end portion of the optical fiber 2 is fixed to a base end of the inside tube 3 in a state in which the resin coating is removed therefrom. The optical fiber 2 has a core 2a, and a cladding 2b provided around the core 2a.

An outer peripheral surface of the cladding 2b is subjected to a mode strip treatment for removing light entering the cladding 2b and propagating in the cladding 2b (cladding-mode light), out of leak light not entering the core 2a. Examples of the leak light not entering the core 2a include light not entering the core 2a because of misalignment (misalignment light), light returning after emitted from the optical fiber 2 and reflected by a workpiece (iron plate) (reflection return light), and so on. The mode strip treatment is, specifically, to roughen the outer peripheral surface of the cladding 2b by liquid phase etching or the like. When this mode strip treatment is implemented, the cladding-mode light becomes scattered to be radiated to the outside of the cladding 2b.

An end cap 6 of a circular shape is connected to an end face of the optical fiber 2. The end cap 6 is made of the same material as the core 2a and has the diameter larger than the core 2a. When this end cap 6 is provided, the energy density of light at the interface to the outside (air) decreases on the end face of the optical fiber 2 and, for this reason, the end face becomes less likely to be damaged by adhesion and burning of impurities such as dust thereon.

The end cap 6 has, for example, a structure in which it is in optical contact with the end face of the optical fiber 2 by fusion splicing or the like. This can reduce a loss due to the reflection return light. The end cap 6 is held in contact with an inner peripheral surface of the tip part of the inside tube 3. When the end cap 6 is provided, the space portion 5 can be readily formed between the optical fiber 2 and the inside tube 3.

An inner wall surface 3a of the inside tube 3 (including the inner peripheral surface) is configured to reflect the majority (preferably, not less than 80% and not more than 98%) of light impinging on the inner wall surface 3a. Specifically, the inside tube 3 may be made of a material likely to reflect light, such as copper or aluminum, or the inner wall surface 3a of the inside tube 3 may be coated with a material likely to reflect light, such as gold or silver. This makes the inside tube 3 reflect most of light impinging on the inner wall surface 3a of the inside tube 3, and absorb only part of the light.

In this configuration, since the space portion 5 is provided between the optical fiber 2 and the inside tube 3, light reflected on the inner wall surface 3a of the inside tube 3 is prevented from propagating in the cladding 2b. In addition, the optical fiber 2 is also prevented from being damaged by heat generated when the light is absorbed by the inside tube 3.

The outside tube 4 is fixed to both ends of the inside tube 3. A cooling space 7 for circulation of cooling water is provided between the inside tube 3 and the outside tube 4. The outside tube 4 is configured with an inlet 8 for allowing the cooling water to flow into the cooling space 7 and an outlet 9 for allowing the cooling water to flow out from the cooling space 7. During use of the laser processing machine, the cooling water is circulated through the cooling space 7 by a circulation system (not shown) including a cooling fan. This makes the inside tube 3 efficiently cooled.

In the optical fiber cable 1 configured as described above, the leak light, e.g., light removed by the mode strip treatment and light not entering even the cladding 2b of the optical fiber 2, comes to impinge on the inner wall surface 3a of the inside tube 3.

For example, if the inside tube 3 is made of a material that absorbs plenty of light, it can cause bumping of the cooling water flowing outside the inside tube 3, or the inside tube 3 itself can be damaged. If the inside tube 3 is made of a material that transmits light, when the leak light is absorbed by the cooling water because of low purity of the cooling water, the leak light can cause bumping of the cooling water; when the leak light is not absorbed by the cooling water because of the purity of the cooling water being not too low, the leak light can be absorbed by the inner wall surface of the outside tube 4, resulting in damaging the outside tube 4 itself.

In contrast to it, the present embodiment is arranged so that most of the leak light impinging on the inner wall surface 3a of the inside tube 3 is reflected thereby and only part of the leak light is absorbed by the inner wall surface 3a of the inside tube 3; therefore, the reflection of the leak light on the inside tube 3 and on the optical fiber 2 is repeated in the space portion 5 between the optical fiber 2 and the inside tube 3. Then, the leak light becomes gradually attenuated and averaged by the multiple reflection.

This inhibits the inside tube 3, the cooling water, and the outside tube 4 from suddenly absorbing the high-intensity light, which can prevent the bumping of the cooling water and the damage of the inside tube 3 and the outside tube 4.

Second Embodiment

Figure 2:
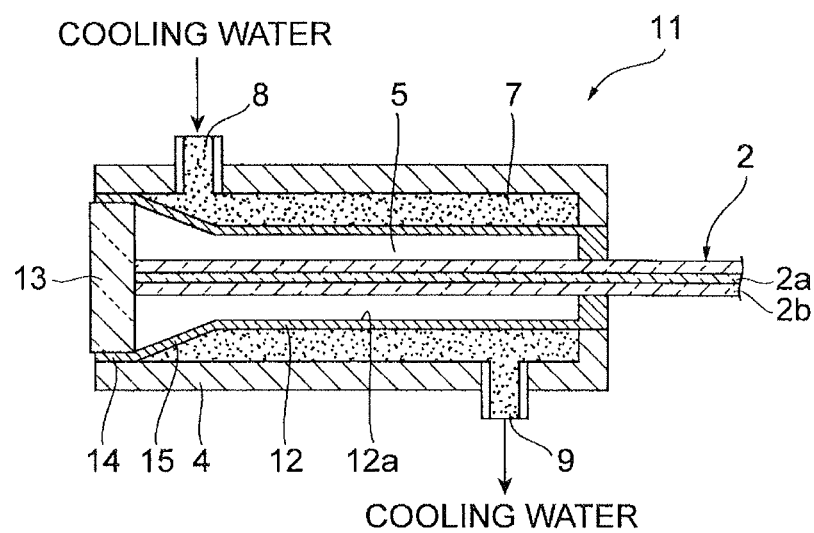
FIG. 2 is a cross-sectional view showing an optical fiber cable according to the second embodiment.

FIG. 2 is a cross-sectional view showing the optical fiber cable according to the second embodiment. In the drawing, elements identical or equivalent to those in the first embodiment are denoted by the same reference signs, while omitting the description thereof.

In FIG. 2, the optical fiber cable 11 of the present embodiment is one to be used in a laser processing machine for applying high-intensity laser light, as the aforementioned optical fiber cable 1 is. The optical fiber cable 11 is provided with an inside tube 12 and an end cap 13, instead of the foregoing inside tube 3 and end cap 6.

An inner wall surface 12a of the inside tube 12 is configured so as to reflect the majority of light as the inner wall surface 3a of the inside tube 3 is. A diameter-expanded portion 14 with the diameter larger than on the base end side of the inside tube 12 is provided at the tip part of the inside tube 12. A taper portion 15 with the diameter increasing toward the diameter-expanded portion 14 is provided on the base end side of the diameter-expanded portion 14 in the inside tube 12.

The end cap 13 has an outside diameter equal to an inside diameter of the diameter-expanded portion 14. Namely, the end cap 13 has a structure in which the area to receive the misalignment light or the reflection return light is larger than that of the aforementioned end cap 6.

In the present embodiment, as described above, since the diameter-expanded portion 14 is provided at the tip part of the inside tube 12, the leak light such as the misalignment light or the reflection return light is inhibited from impinging on the end face of the outside tube 4. Therefore, the end face of the outside tube 4 is kept from being damaged. Furthermore, the leak light entering the inside tube 12 through the end cap 13 is highly likely to first impinge on the inner wall surface of the taper portion 15. At this time, the leak light is obliquely incident to the inner wall surface of the taper portion 15, which can lower the energy density of light.

Third Embodiment

Figure 3:
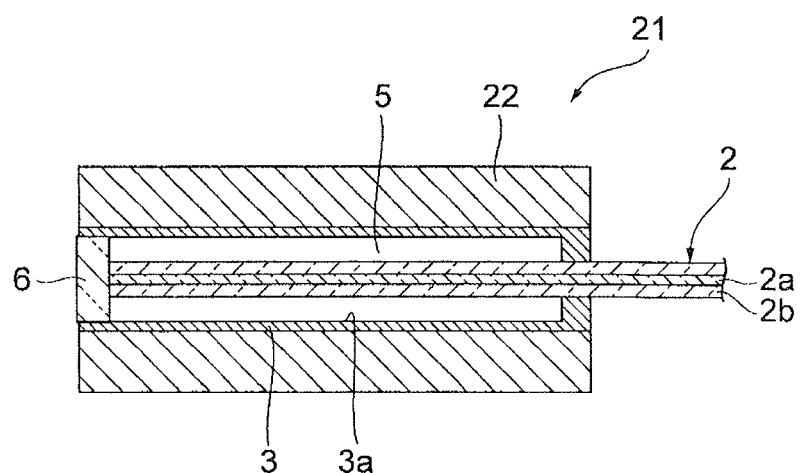
FIG. 3 is a cross-sectional view showing an optical fiber cable according to the third embodiment.

FIG. 3 is a cross-sectional view showing the optical fiber cable according to the third embodiment. In the drawing, elements identical or equivalent to those in the first embodiment are denoted by the same reference signs, while omitting the description thereof.

In FIG. 3, the optical fiber cable 21 of the present embodiment is one to be used in a laser processing machine for applying laser light with lower intensity (e.g., 1 kW or less) than in the case of the above-described optical fiber cables 1, 11.

The optical fiber cable 21 is provided with an outside tube 22, in place of the foregoing outside tube 4. The outside tube 22 is made of a material with good thermal conductivity (e.g., aluminum). The outer peripheral surface of the inside tube 3 is in direct contact with an inner peripheral surface of the outside tube 22. Namely, the aforementioned cooling space 7 for circulation of cooling water is not provided between the inside tube 3 and the outside tube 22.

As described above, when the leak light impinges on the inner wall surface 3a of the inside tube 3, most of the leak light is reflected on the inside tube 3 and only part of the leak light is absorbed by the inside tube 3; therefore, the outside tube 22 is hardly damaged, even with no cooling water flowing between the inside tube 3 and the outside tube 22. Since the outside tube 22 has high thermal conductivity, heat generated by the light absorbed by the inside tube 3 comes to be gradually dissipated by the outside tube 22.

In the present embodiment, as described above, there is no need for flow of cooling water between the inside tube 3 and the outside tube 22, which can simplify the terminal structure of the optical fiber cable 21 and a facility configuration of the laser processing machine, thereby achieving reduction of cost.

The present invention is not limited only to the above embodiments. For example, the above embodiments employed the configuration wherein the end cap 6 or the end cap 13 was in optical contact with the end face of the optical fiber 2, but, instead of use of these end caps, a lens of a spherical shape may be located in front of the end face of the optical fiber 2, or the end of the optical fiber 2 may be processed in a lens shape.

The above first and second embodiments employed the configuration wherein the cooling water was arranged to flow through the cooling space 7 between the inside tube 3 or the inside tube 12 and the outside tube 4, but cooling air or the like may be used as a cooling medium to be circulated through the cooling space 7. It is, however, noted that when cooling water is used, the facility configuration is simple and less time and effort is needed for purity management.

Fourth Embodiment

Figure 4:
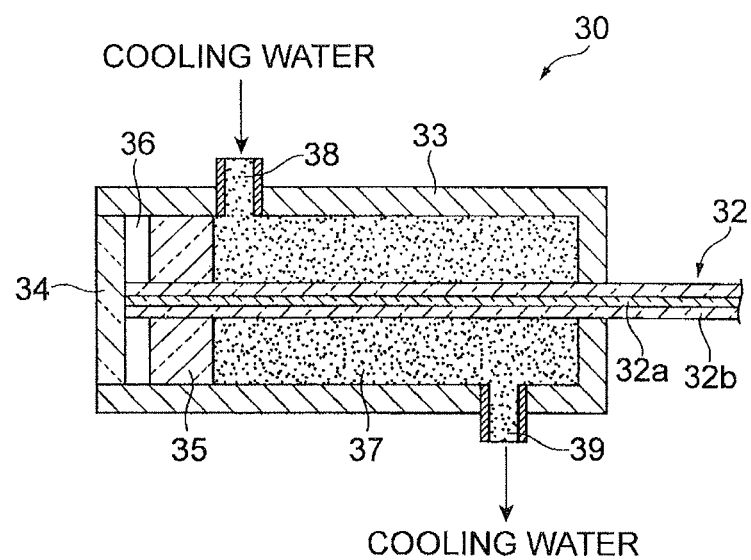
FIG. 4 is a cross-sectional view showing an optical fiber cable according to the fourth embodiment.

FIG. 4 is a cross-sectional view showing the optical fiber cable according to the fourth embodiment. In FIG. 4, the optical fiber cable 30 of the present embodiment is one to be used in a laser processing machine for applying laser light with high intensity (e.g., from 2 kW to 10 kW) to weld or cut an iron plate such as a body of a vehicle.

The optical fiber cable 30 is provided with an optical fiber 32 for propagating the laser light, and a tubular member 33 of metal housing an end portion of this optical fiber 32. The tubular member 33 is provided at both end portions of the optical fiber cable 30. The part except for the end portions in the optical fiber cable 1, which is not shown in particular, has a structure in which the optical fiber 32 is protected by a flexible tube of stainless steel and in which a resin layer is formed on the surface of the flexible tube.

The end portion of the optical fiber 32 is fixed to a base end (rear end) of the tubular member 33 in a state in which the resin coating is removed therefrom. The optical fiber 32 has a core 32a, and a cladding 32b provided around this core 32a.

An outer peripheral surface of the cladding 32b is subjected to a mode strip treatment for removing light entering the cladding 32b and propagating in the cladding 32b (cladding-mode light), out of leak light not entering the core 32a. Examples of the leak light not entering the core 32a include light not entering the core 32a because of misalignment (misalignment light), light returning after emitted from the optical fiber 32 and reflected by a workpiece (iron plate) (reflection return light), and so on. The mode strip treatment is, specifically, to roughen the outer peripheral surface of the cladding 32b by liquid phase etching or the like.

Figure 5:
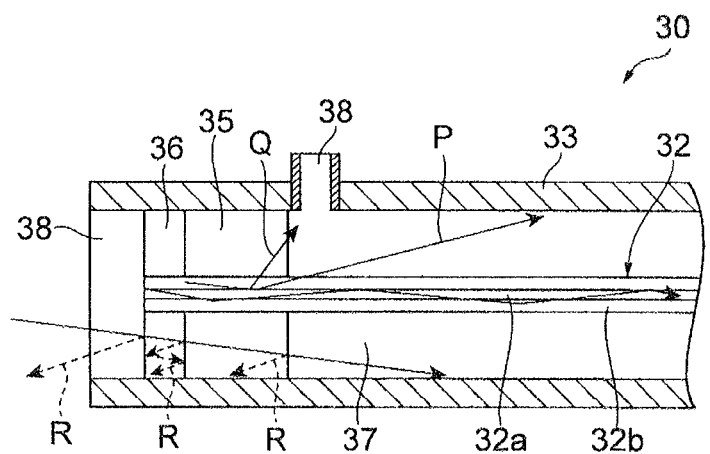
FIG. 5 is a drawing schematically showing directions of passage of laser light entering an interior of a tubular member shown in FIG. 4.

In the presence of the cladding-mode light, there is a possibility that the cladding-mode light emerges from the optical fiber 32, for example, at a bent portion of the optical fiber cable 30 to heat the flexible tube to result in burning of the resin layer and disconnection of the optical fiber cable 30 eventually. The laser light emerging from the core 32a impinges at a desired position of the workpiece but the laser light emerging from the cladding 32b impinges off the desired position and, therefore, can damage the workpiece. When the foregoing mode strip treatment is implemented, the cladding-mode light becomes scattered to be radiated to the outside of the cladding 32b (cf. solid line P) as shown in FIG. 5, which can suppress the disconnection of the optical fiber cable 30 and the damage to the workpiece.

An outside transparent window 34 of a circular shape is in optical contact with the end face of the optical fiber 32 by fusion splicing or the like. The outside transparent window 34 is held in contact with an inner peripheral surface of the tip part (front end) of the tubular member 33. The outside transparent window 34 is made of the same material as the core 32a and has the diameter larger than the core 32a.

Since the optical fiber 32 propagates the high-power laser light, if dust or the like adheres to the end face of the optical fiber 32, the end face of the optical fiber 32 will be burnt and damaged. When the outside transparent window 34 is in optical contact with the end face of the optical fiber 32, the end face of the optical fiber 32 is not exposed and the energy density of light is lowered at the interface between the optical fiber 32 and the outside (air); therefore, this makes the damage of the optical fiber 32 less likely to occur due to the adhesion of dust or the like.

An inside transparent window 35 is arranged inside (on the rear end side) of the outside transparent window in an interior of the tubular member 33. The inside transparent window 35 is made of a transparent material that, even with application of the laser light, does not absorb the laser light and thus is not damaged thereby. The refractive index of the inside transparent window 35 is equal to or larger than the refractive index of the cladding 32b. This causes the cladding-mode light to be guided into the inside transparent window 35 (cf. solid line Q) as shown in FIG. 5, which can further suppress the disconnection of the optical fiber cable 30 and the damage to the workpiece as described above. A gap portion 36 is provided between the outside transparent window 34 and the inside transparent window 35.

A space enclosed by the tubular member 33 and the inside transparent window 35 inside the inside transparent window 35 in the interior of the tubular member 33 forms a coolant-circulating region 37 for circulation of a coolant (cooling water herein). The tubular member 33 is configured with an inlet 38 for allowing the cooling water to flow into the coolant-circulating region 37 and an outlet 39 for allowing the cooling water to flow out from the coolant-circulating region 37. During use of the laser processing machine, the cooling water is circulated through the coolant-circulating region 37 by a circulation system (not shown) including a cooling fan.

In this case, the inside transparent window 35 and the inner peripheral surface of the tubular member 33 are hermetically fixed so as to securely confine the cooling water in the coolant-circulating region 37 without leakage thereof to the gap portion 36.

For making it easier to guide the cladding-mode light into the inside transparent window 35 and preventing the cooling water from leaking to the gap portion 36, the inside transparent window 35 and the cladding 32b of the optical fiber 32 are hermetically fixed by fusion splicing. The fusion splicing of the inside transparent window 35 and the cladding 32b can reduce the loss due to the reflection return light (described previously).

On the other hand, there is no need for airtightness for confining the cooling water in particular between the outside transparent window 34 and the tubular member 33. Namely, it is sufficient for the outside transparent window 34 to be held on the tubular member 33 so as not to move. Therefore, a holding force between the tubular member 33 and the outside transparent window 34 is smaller than a fixing force between the tubular member 33 and the inside transparent window 35.

Figure 6:
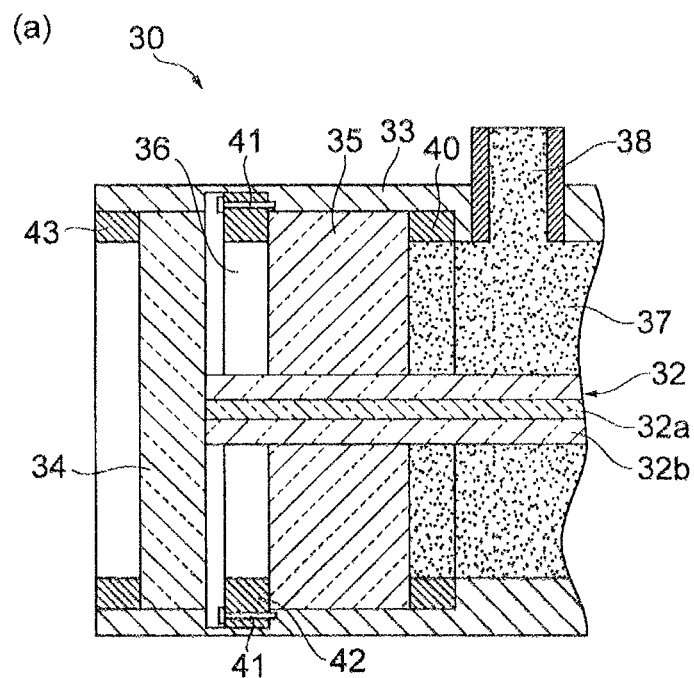
FIG. 6 is cross-sectional views showing structures for attaching an inside transparent window and an outside transparent window shown in FIG. 4, to the tubular member.
Figure 6:
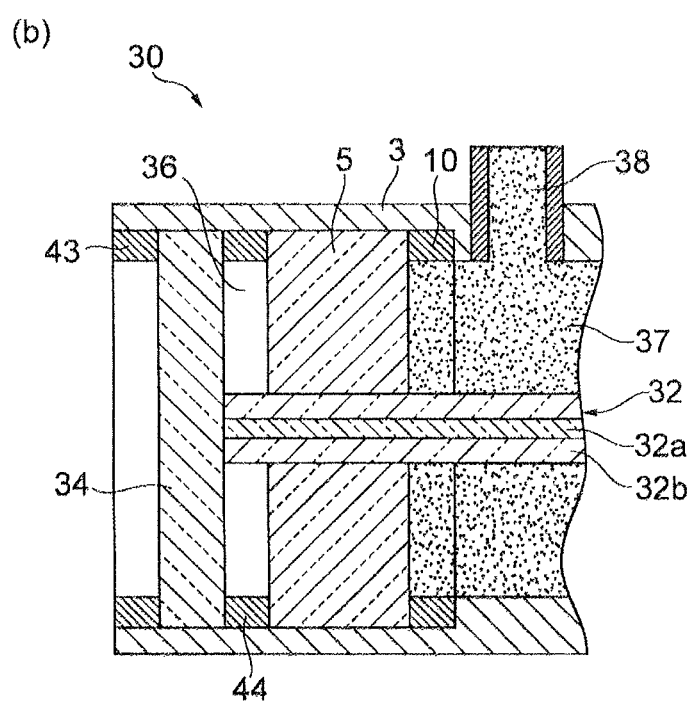

FIG. 6(a) shows a structure for attaching the inside transparent window 35 and the outside transparent window 34 to the tubular member 33. In the structure shown in the same drawing, in a state in which a metal gasket 40 is interposed between the tubular member 33 and the inside transparent window 35, bolts 41 are screwed through a press ring 42 into the tubular member 33 whereby the inside transparent window 35 is pushed against the metal gasket 40 by the press ring 42. At this time, a force enough to crush the metal gasket 40 is applied to the inside transparent window 35 by the bolts 41 and the press ring 42, whereby the inside transparent window 35 is securely hermetically fixed through the metal gasket 40 to the tubular member 33.

The outside transparent window 34 is held on the tubular member 33 by a press screw ring 43. A threaded part to be mated with the press screw ring 43 is formed in the inner peripheral surface of the tubular member 33. The press screw ring 43 is screwed into the threaded part whereby the outside transparent window 34 is held on the tubular member 33 while not hermetically fixed.

FIG. 6(b) shows another structure for attaching the inside transparent window 35 and the outside transparent window 34 to the tubular member 33. In the structure shown in the same drawing, in a state in which the metal gasket 40 is interposed between the tubular member 33 and the inside transparent window 35, the inside transparent window 35 is pushed against the metal gasket 40 by a press screw ring 44. A threaded part to be mated with the press screw ring 44 is formed in the inner peripheral surface of the tubular member 33. The press screw ring 44 is screwed into the threaded part to apply a force enough to crush the metal gasket 40, to the inside transparent window 35, whereby the inside transparent window 35 comes to be securely hermetically fixed through the metal gasket 40 to the tubular member 33. The structure for holding the outside transparent window 34 on the tubular member 33 is the same as that shown in FIG. 6(a).

The operational effect of the optical fiber cable 30 of the present embodiment will be described below. An example of the conventionally known optical fiber cable having the optical fiber for transmitting high-intensity light is one provided with a wall involving a coolant (e.g., cooling water) surrounding the outer coating surface at the end of the optical fiber, and a transparent window in optical contact with the end face of the optical fiber (e.g., Japanese Patent No. 3699486).

There is the following problem in the above conventional technology. Namely, the coolant is circulated in general and it is necessary to keep airtightness between the transparent window and the wall so as to prevent the coolant from leaking. For this reason, the transparent window needs to be fixed to the wall with application of a sufficient fixing force, with the result that the force is applied to the transparent window. Furthermore, a force is also applied to the transparent window by flow of the coolant, so as to deform the transparent window, resulting in change in the refractive index of the transparent window. Therefore, it degrades the quality of the laser light, e.g., change in intensity distribution of the laser light passing through the transparent window, or occurrence of distortion of the laser light. As a result, it leads to degradation of processing accuracy in laser processing with the laser light.

On the other hand, when a rubber O-ring is used for ensuring airtightness between the transparent window and the wall, it is possible to reduce the load applied for fixing the transparent window to the wall. However, if the laser light leaks to impinge on the O-ring, the O-ring might be damaged.

Furthermore, part of the laser light not entering the core of the optical fiber out of the laser light passing through the transparent window is directly incident into the coolant to be absorbed therein. The coolant to be used is usually one with high purity, such as ion exchanged water. However, if impurities are mixed in the coolant, light absorptivity of the coolant will increase and it can cause bumping of the coolant and damage the wall eventually. For this reason, there are needs for the optical fiber cable capable of preventing the deformation of the transparent window in optical contact with the end face of the optical fiber and the bumping of the coolant.

In contrast to it, the optical fiber cable 30 configured as described above has the configuration wherein, since the rear end face (inside face) of the inside transparent window 35 is in contact with the cooling water, the inside transparent window 35 is firmly fixed to the tubular member 33 and the optical fiber 32 so as to maintain airtightness between the inside transparent window 35 and the tubular member 33 and optical fiber 32 as described above. For this reason, the cooling water applies stress to the inside transparent window 35 to deform the inside transparent window 5. This deformation of the inside transparent window 35 is transferred to the optical fiber 32 but, since the inside transparent window 35 is in contact with the cladding 32b of the optical fiber 32, there is little influence on the quality of the laser light passing through the core 32a of the optical fiber 32.

On the other hand, while the outside transparent window 34 is in optical contact with the end face of the optical fiber 32, the outside transparent window 34 is held on the tubular member 33 so as not to move and the gap portion 36 is formed between the outside transparent window 34 and the inside transparent window 35; therefore, the deformation of the inside transparent window 35 is not transferred to the outside transparent window 34. For this reason, no stress is applied to the outside transparent window 34, which prevents deformation of the outside transparent window 34. This causes no change in the refractive index of the outside transparent window 34, which can prevent the troubles including the change in intensity distribution of the laser light passing through the outside transparent window 34, and the occurrence of distortion of the laser light.

Since the gap portion 36 is formed between the outside transparent window 34 and the inside transparent window 35, light passing through the outside transparent window 34 but not coupled to the core 32a of the optical fiber 32 is reflected little by little on the rear end face (inside face) of the outside transparent window 34, and the front end face (outside face) and rear end face (inside face) of the inside transparent window 35 (cf. dashed lines R) as shown in FIG. 5. At this time, multiple reflection of light is more likely to occur in the gap portion 36. Therefore, the intensity of light absorbed by the cooling water is lowered and, then, even if impurities are mixed in the cooling water, the bumping of the cooling water can be prevented.

In the present embodiment, as described above, the optical fiber cable is provided with the outside transparent window 34 being in optical contact with the end face of the optical fiber 32 and held in contact with the front end part of the tubular member 33, and the inside transparent window 35 arranged in the interior of the tubular member 33 and hermetically fixed to the tubular member 33 and the optical fiber 32, and has the gap portion 36 between the outside transparent window 34 and the inside transparent window 35; this configuration can prevent degradation of the quality of the laser light passing through the outside transparent window 34. This can prevent degradation of processing accuracy in laser processing with the laser light. In addition, since the bumping of the cooling water is prevented, the tubular member 33 is also prevented from being damaged.

The present invention is by no means intended to be limited to the above embodiments. For example, the above embodiments adopted the configurations of single optical fiber 2, 32, but the number of optical fiber 2, 32 may be two or more, or a fiber bundle may be used.

REFERENCE SIGNS LIST

1 optical fiber cable; 2 optical fiber; 2a core; 2b cladding; 3 inside tube; 3a inner wall surface; 4 outside tube; 5 space portion; 6 end cap; 7 cooling space; 11 optical fiber cable; 12 inside tube; 12a inner wall surface; 14 diameter-expanded portion; 15 taper portion; 21 optical fiber cable; 22 outside tube; 1 optical fiber cable; 32 optical fiber; 32a core; 32b cladding; 33 tubular member; 34 outside transparent window; 35 inside transparent window; 36 gap portion; 37 coolant-circulating region; 40 metal gasket.

The invention claimed is:

1. An optical fiber cable having an optical fiber comprising a core, and a cladding provided around the core, the optical fiber cable comprising:
    an inside tube housing an exposed portion of the cladding in an end portion of the optical fiber; and
    an outside tube provided so as to surround the inside tube,
    wherein the exposed portion of the cladding is subjected to a treatment for removing light propagating in the cladding,
    wherein at least an inner wall surface of the inside tube is made so as to have a light reflecting property and absorb part of the light removed from the cladding,
    wherein a space portion is formed between the optical fiber and the inside tube, and
    wherein the light removed from the cladding is gradually attenuated and averaged by multiple reflection on the inside tube and on the cladding in the space portion.

2. The optical fiber cable according to claim 1, wherein a reflectance of the inner wall surface of the inside tube is not less than 80% and not more than 98%.

3. The optical fiber cable according to claim 1, wherein a cooling space for circulation of a cooling medium is formed between the inside tube and the outside tube.

4. An optical fiber cable having an optical fiber comprising a core, and a cladding provided around the core, the optical fiber cable comprising:
    an inside tube housing an exposed portion of the cladding in an end portion of the optical fiber; and
    an outside tube provided so as to surround the inside tube,
    wherein the exposed portion of the cladding is subjected to a treatment for removing light propagating in the cladding,
    wherein at least an inner wall surface of the inside tube is made so as to have a light reflecting property and absorb part of the light removed from the cladding,
    wherein a space portion is formed between the optical fiber and the inside tube, and
    wherein an end cap comprised of the same material as the core of the optical fiber and having a diameter larger than the core is optically connected to an end face of the optical fiber, and
    wherein the space portion is defined by the inner wall surface of the inside tube, a base end of the inside tube for fixing the exposed portion of the cladding, and the end cap.

5. An optical fiber cable having an optical fiber comprising a core, and a cladding provided around the core, the optical fiber cable comprising:
    an inside tube housing an exposed portion of the cladding in an end portion of the optical fiber; and
    an outside tube provided so as to surround the inside tube,
    wherein the exposed portion of the cladding is subjected to a treatment for removing light propagating in the cladding,
    wherein at least an inner wall surface of the inside tube is made so as to have a light reflecting property and absorb part of the light removed from the cladding,
    wherein a space portion is formed between the optical fiber and the inside tube, and wherein a diameter-expanded portion having a larger diameter than a base end side of the inside tube is provided in a tip part of the inside tube.

6. The optical fiber cable according to claim 5, wherein a taper portion with a diameter increasing toward the diameter-expanded portion is provided on the base end side of the diameter-expanded portion in the inside tube.

* * * * *